May 4, 1937.   M. E. NOYES   2,078,967
TAP CLAMP
Filed June 13, 1933
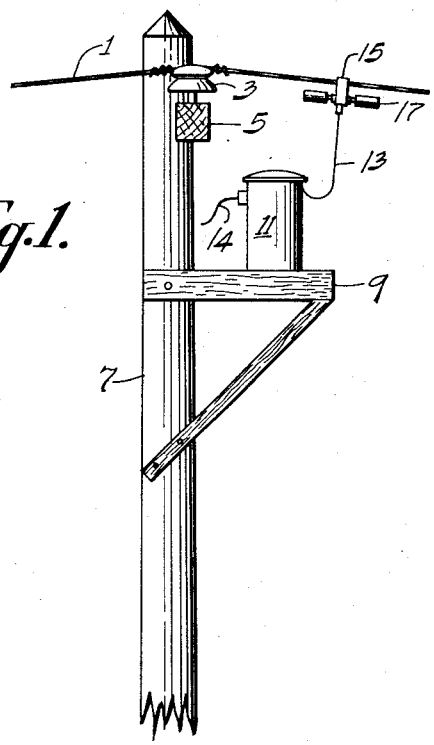
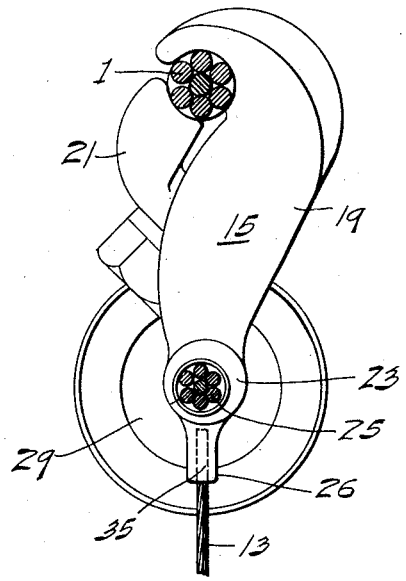
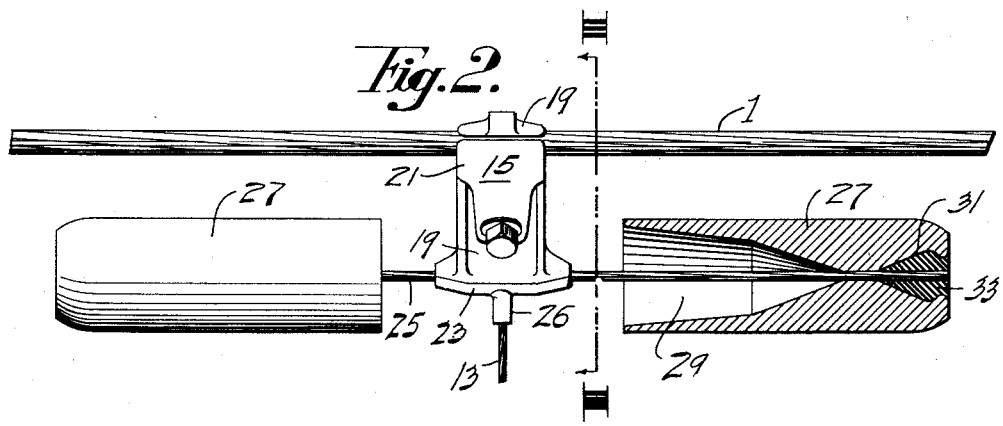
INVENTOR
Maxwell E. Noyes
BY
ATTORNEY Patented May 4, 1937

2,078,967

UNITED STATES PATENT OFFICE 2,078,967

TAP CLAMP

Maxwell E. Noyes, Mount Lebanon, Pa., assignor to Aluminum Company, of America, Pittsburgh, Pa., a corporation of Pennsylvania Application June 13, 1933, Serial No. 675,556

5 Claims. (Cl. 173—273)

This invention relates to electrical transmission or distribution systems. It relates particularly to tap clamps of the type used in connecting a tap wire to a transmission or distribution line, the tap wire being usually employed to connect the line to a service transformer, or directly to a branch circuit.

Tap clamps of this type may be secured to the distribution line by one or more bolts or other fastening devices. Such clamps are very effective for the purpose for which they are intended as long as they are tightly secured in position, but if for any reason the contact between the clamp and the line wire or the tap wire becomes loose, the effect is an increasing electrical resistance which may eventually cause serious burning of the wire or clamp. Another undesirable result of loosening is the disturbance to radio reception in the vicinity, caused by the impulses acting to break down the air film between the wire and the clamp.

The chief, if not the sole, cause of loosening and poor contact of the clamp is vibration of the line wire to which it is attached. This vibration, together with the weight of the clamp and the tap wire, also tends to cause failure of the transmission line at the point of attachment of the clamp. The resulting high maintenance costs and the other undesirable features of previous attachments have created a demand for a tap clamp which is not subject to these objections, and my invention contemplates the provision of such a device.

The injurious effects of vibration on transmission lines and the like have previously been recognized, and methods have been devised for eliminating or minimizing these effects. This is usually done by clamping a vibration damper to the line near its point of support. I have found that the proper and most effective location for a damper of this nature is generally the proper location, or at least a convenient location, for a tap clamp when such a clamp is required, and I have found that this makes it possible to overcome the difficulties encountered in the use of previous tap clamps, which is the principal object of this invention, by employing a vibration damper having a supporting clamp which serves also as a tap clamp. For this purpose I may use a vibration damper of any type comprising a suitable clamp, but I prefer to employ a damper of the type in which inertia members are resiliently supported from a support secured to the transmission line, as described in U. S. Patent No. 1,675,391 to Stockbridge and, in an improved form, in a copending application of Noyes et al., Serial No. 663,748, filed March 31, 1933.

The construction and further objects of my invention will be more readily understood from the following description taken with the accompanying drawing, in which:

Fig. 1 is a somewhat diagrammatic elevational view showing my improved tap clamp assembly in one operative position;

Fig. 2 is an enlarged view, partly in elevation and partly in section, of a preferred embodiment of my invention; and Fig. 3 is a further enlarged view taken along the line III—III of Fig. 2.

Referring to the drawing, in which like reference numerals indicate like parts in each of the views, a transmission or distribution line 1 is attached to an insulator 3, which is supported by a suitable cross-bar 5 located upon a pole 7. Situated upon a support 9 which is attached to the pole is a service transformer 11, which is connected to the line 1 by a tap wire 13. Wires 14 connect the transformer with a house circuit or other branch circuit (not shown). It will be understood that in some cases the transformer may be omitted and the tap wire connected directly to the branch circuit, and that other supporting means may be substituted for the pole and cross-arm.

The tap wire 13 is connected to the transmission line 1 by a suitable tap clamp 15, which also supports vibration damping means 17. The clamp 15 may be of any construction adapted to securely engage the line 1, but I prefer to employ a clamp of the type shown having a curved body 19 and a slidable arm 21 having faces suitably curved or grooved to firmly engage the line 1. The clamp body 19 has an intermediate seating portion on which the arm 21 is slidably mounted, a lower portion 23 adapted to engage a resilient member 25, and a cylindrical socket or drilled lug 26, which is preferably at the bottom of the clamp. The tap wire 13 is secured to the socket 26 by soldering or otherwise, and is thereby connected to the transmission line 1. The resilient member 25 may be of any suitable form or material, but it is preferably made of stranded galvanized steel cable or the like, and is rigidly fixed in the lower retaining portion 23 of the clamp 15.

In the preferred embodiment of my invention, the vibration damping means comprises a plurality of weights or inertia members 27 rigidly fixed to the ends of the resilient member 25. Preferably, these inertia members are substantially cup-shaped, each being cylindrical in cross section and provided with a longitudinal recess 29 at one end. The other end of the inertia member is substantially solid, but is provided with an aperture 31, preferably of smaller diameter than the recess 29 and communicating therewith, as described in the above-mentioned copending application. The inertia members are attached to the ends of the resilient member 25 in any suitable fashion. For example, in the structure shown, the resilient member extends through the recess 29 into the aperture 31, and is secured therein by pouring molten zinc 33 or other suitable metal into the aperture 31, where it solidifies.

Effective attachment of the tap wire 13 to the clamp 15 is made through the socket 26, preferably by soldering. In order to prevent difficulties which might result from oxidation of the socket 26 prior to the attachment of the tap wire 13, it is desirable that the surface of its opening 35 be tinned, and that the opening be filled with solder, preferably before the device is shipped to the field for attachment. By preparing the socket in this fashion prior to the installation of the tap clamp, the field work is simplified and facilitated, since the solder in the socket will become molten when heated, and it is then only necessary to insert the tap wire and allow the joint to cool. Because of the construction of the clamp 15 it is also readily attached to the line 1 with known tools, even when the line is in use.

The operation and advantages of my improved tap clamp with integral vibration damping means will now be readily understood. By means of this device, the possibility that the tap clamp will become loosened is substantially eliminated, since the objectionable vibrations which have heretofore caused most or all of the difficulties with tap clamps are prevented. A permanently tight connection between the tap wire and the transmission line is therefore obtained. Furthermore, the reduction in vibration at the point of attaching the tap clamp to the transmission line results in a prolonged life for the transmission line, and maintenance costs are considerably reduced.

While my invention has been described and illustrated hereinabove with special reference to a preferred embodiment thereof, it is to be understood that obvious changes and modifications may be made therein within the scope of the appended claims, without departing from the spirit of my invention.

I claim as my invention:

1. In combination with a transmission line a unitary structure comprising a demountable clamp, a socket on said clamp for attaching a tap line thereto, a tap line secured within said socket, and means fixed to said clamp for damping vibratory motion of said transmission line and clamp.

2. In combination with a transmission line a unitary structure comprising a demountable clamp, firmly engaging said transmission line and having a tap line substantially permanently attached thereto, and resiliently supported inertia members for damping vibratory motion of said transmission line and clamp.

3. In combination with a transmission line a unitary structure comprising a demountable clamp having a body portion curved at its upper end to provide a line gripping face, an intermediate seating portion in said body portion, a slidable arm detachably mounted on said seating portion and having a face portion adapted to co-operate with the gripping face of the body portion to secure the clamp to said line, a socket for attaching a tap line to said clamp, and means attached to said clamp for damping vibratory motion of said line and clamp.

4. In combination with a transmission line a unitary structure comprising a demountable clamp having a body portion curved at its upper end to provide a line gripping face, an intermediate seating portion in said body portion, a slidable arm detachably mounted in said seating portion and having a face portion adapted to co-operate with the gripping face of the body portion to secure the clamp to said line, means for attaching a tap line to said clamp, and resiliently supported inertia members for damping vibratory motion of said line and clamp.

5. A tap line connecting clamp for transmission lines, comprising a clamp adapted to engage a transmission line and having a socket adapted to receive a tap line for substantially permanent attachment thereto, and inertia members resiliently supported from the said clamp and adapted to damp the vibratory motion of said clamp and the transmission line to which it is adapted in use.

MAXWELL E. NOYES.